(12) United States Patent
Takahashi (10) Patent No.: US 9,048,751 B2
(45) Date of Patent: Jun. 2, 2015

(54) POWER SUPPLY CIRCUIT WITH RIPPLE COMPENSATION

(75) Inventor: Yukio Takahashi, Gunma-Ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 152 days.

(21) Appl. No.: 13/435,993

(22) Filed: Mar. 30, 2012

(65) Prior Publication Data

US 2012/0250381 A1 Oct. 4, 2012

(30) Foreign Application Priority Data

Mar. 31, 2011 (JP) .................................. 2011-79940

(51) Int. Cl.
*H02M 7/00* (2006.01)
*H02M 7/04* (2006.01)
*H02M 1/42* (2007.01)
*H02M 1/00* (2006.01)

(52) U.S. Cl.
CPC ............ *H02M 1/4225* (2013.01); *Y02B 70/126* (2013.01); *Y02B 70/16* (2013.01); *H02M 2001/0032* (2013.01)

(58) Field of Classification Search
USPC ............................... 363/44, 89, 123, 124, 125
See application file for complete search history.

(56) References Cited

U.S. PATENT DOCUMENTS

| | | | | |
|---|---|---|---|---|
| 5,612,609 | A * | 3/1997 | Choi | 323/210 |
| 5,757,166 | A * | 5/1998 | Sodhi | 323/222 |
| 5,761,057 | A * | 6/1998 | Muchenberger | 363/21.01 |
| 7,068,016 | B2 * | 6/2006 | Athari | 323/222 |
| 7,256,569 | B2 * | 8/2007 | Wu et al. | 323/222 |
| 7,391,631 | B2 * | 6/2008 | Shimada | 363/89 |
| 7,466,110 | B2 * | 12/2008 | Tsuruya | 323/207 |
| 7,936,152 | B2 * | 5/2011 | Shimizu | 323/222 |
| 8,345,456 | B2 * | 1/2013 | Nishikawa | 363/89 |
| 8,525,501 | B2 * | 9/2013 | Hsieh et al. | 323/283 |
| 2008/0130336 | A1 | 6/2008 | Taguchi | |
| 2009/0257258 | A1 * | 10/2009 | Ayukawa et al. | 363/89 |
| 2010/0165683 | A1 * | 7/2010 | Sugawara | 363/126 |
| 2010/0265741 | A1 * | 10/2010 | Usui | 363/21.12 |
| 2011/0211377 | A1 * | 9/2011 | Uno | 363/124 |
| 2012/0092900 | A1 * | 4/2012 | Orr | 363/21.03 |

FOREIGN PATENT DOCUMENTS

| | | |
|---|---|---|
| CN | 101080864 A | 11/2007 |
| JP | H8-28966 | 3/1996 |
| JP | 2000-224858 A | 8/2000 |

OTHER PUBLICATIONS

EPO English translation of JPH8-28966 (JPH0828966).

* cited by examiner

Primary Examiner — Emily P Pham (57) ABSTRACT

A power-supply circuit includes: a rectification circuit to output a rectified voltage obtained by rectifying an AC voltage; an inductor to be applied with the rectified voltage; a transistor to increase an inductor current when turned on; a diode to output the inductor current when the transistor is turned off; a capacitor to generate a DC voltage; a detection circuit to detect the inductor current; and a switching control circuit to perform switching of the transistor, when the detected current is smaller than a reference current, and stop switching of the transistor when the detected current is larger than the reference current, the target level corresponding to a level at which the diode is turned on when the rectified voltage rises, when the diode is turned on, the inductor and the capacitor respectively having inductance and capacitance values for allowing the inductor current larger than the reference current to flow.

18 Claims, 8 Drawing Sheets

POWER SUPPLY CIRCUIT WITH RIPPLE COMPENSATION

CROSS-REFERENCE TO RELATED APPLICATION

This application claims the benefit of priority to Japanese Patent Application No. 2011-079940, filed Mar. 31, 2011, of which full contents are incorporated herein by reference.

BACKGROUND OF THE INVENTION

1. Field of the Invention

The present invention relates to a power supply circuit.

2. Description of the Related Art

In an AC-DC converter, a target level DC voltage is generated when a transistor to which a voltage according to an AC voltage is applied is switched in general. Also, as a Power Factor Correction (PFC) control method in the AC-DC converter, a partial switching method is known as a method of using an inductor which is inexpensive but poor in frequency characteristics (silicon steel plate reactor, for example) (Japanese Patent Laid-Open No. 2000-224858, for example).

In the partial switching method, switching of the transistor is stopped in the vicinity of a peak of an AC voltage inputted to the AC-DC converter. Then, a zero-cross detection circuit and a microcomputer are required for the AC-DC converter to execute the partial switching method.

SUMMARY OF THE INVENTION

A power supply circuit, configured to generate a DC voltage at a target level from an AC voltage, includes: a rectification circuit configured to output a rectified voltage obtained by rectifying the AC voltage; an inductor configured to be applied with the rectified voltage; a transistor connected in series with the inductor, the transistor configured to increase an inductor current flowing through the inductor when turned on; a diode connected in series with the inductor, the diode configured to output the inductor current when the transistor is turned off ; a capacitor configured to be charged with a current from the diode and generate the DC voltage; a detection circuit configured to detect the inductor current; and a switching control circuit configured to be inputted with the detected inductor current and a feedback voltage, the feedback voltage changed according to the DC voltage, perform switching of the transistor so that a level of the DC voltage is equal to the target level and the inductor current is equal to the reference current, when the detected inductor current is smaller than a reference current changed according to the feedback voltage, and stop switching of the transistor when the detected inductor current is larger than the reference current, the target level corresponding to a level at which the diode is turned on when the rectified voltage rises, when the rectified voltage rises and the diode is turned on, the inductor and the capacitor respectively having an inductance value and a capacitance value for allowing the inductor current larger than the reference current to flow, the reference current corresponding to a current when the level of the DC voltage is equal to the target level.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<<First Embodiment (Power Supply Circuit 10)>>

Figure 1:
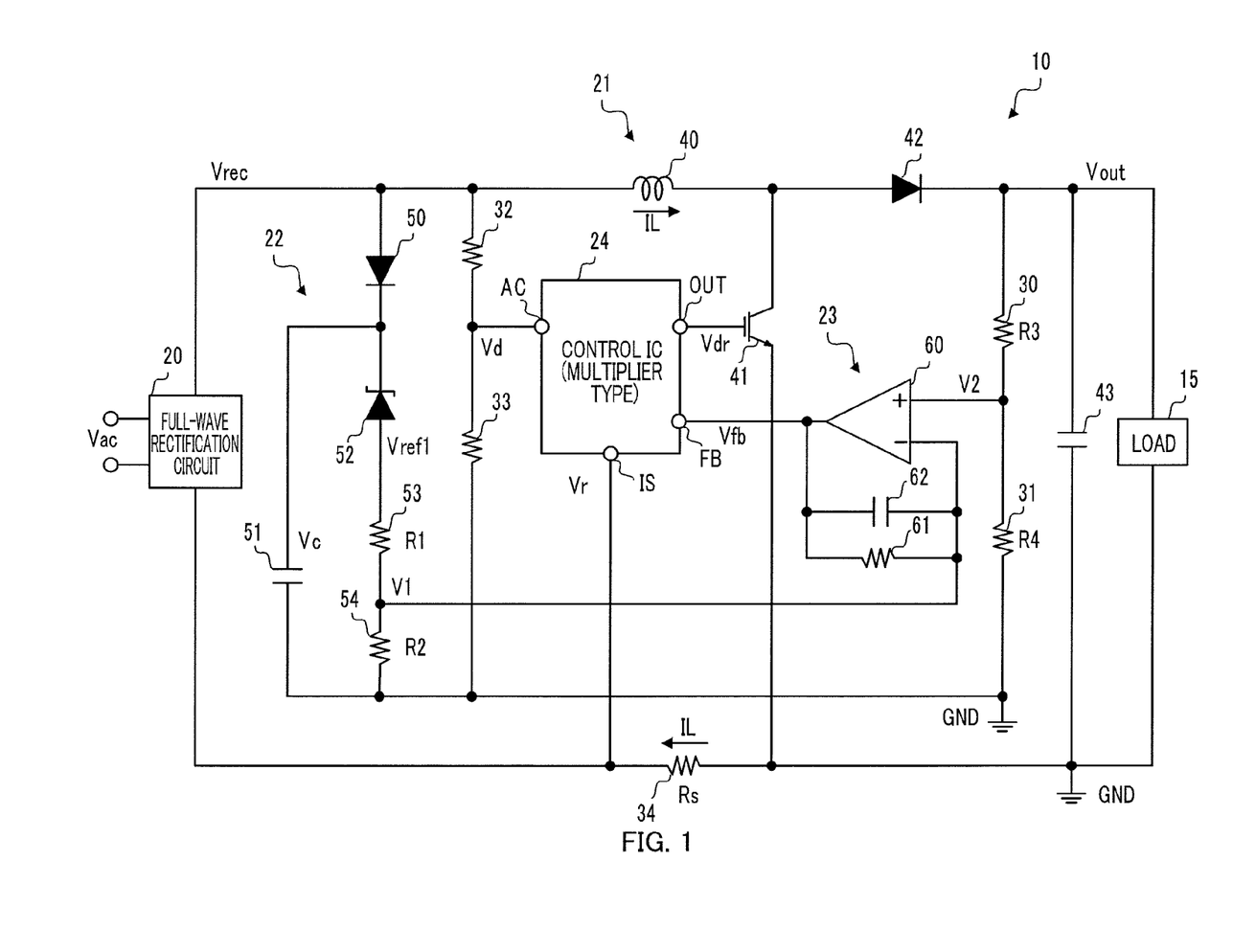
FIG. 1 is a diagram illustrating a configuration of a power supply circuit 10 which is a first embodiment of the present invention.

FIG. 1 is a diagram illustrating a configuration of a power supply circuit 10 which is a first embodiment of the present invention. The power supply circuit 10 is an AC-DC converter which generates an output voltage Vout (DC voltage) at a target level lower than a peak level of an AC voltage Vac from the AC voltage Vac and drives a load 15. The power supply circuit 10 includes a full-wave rectification circuit 20, a boost circuit 21, a reference voltage circuit 22, an error amplifier 23, a control IC (Integrated Circuit) 24, and resistors 30 to 34.

The full-wave rectification circuit 20 full-wave rectifies the inputted AC voltage Vac and outputs a rectified voltage Vrec.

The boost circuit 21 is a so-called boost-type chopper circuit and includes an inductor 40, a transistor 41, a diode 42, and a capacitor 43.

The rectified voltage Vrec is applied to one end of the inductor 40 and the other end is connected to an anode of the diode 42. A current flowing through the inductor 40 is referred to as an inductor current IL.

The transistor 41 is a power transistor such as an IGBT (Insulated gate bipolar transistor) and the like connected in series to the inductor 40. A collector electrode of the transistor 41 is connected to the inductor 40, and an emitter electrode is grounded, and thus, when the transistor 41 is turned on, the inductor current IL increases.

The diode 42 is connected in series to the inductor 40 and when the transistor 41 is turned off, the inductor current IL excited during the ON period of the transistor 41 is supplied to the capacitor 43.

The capacitor 43 is charged with the inductor current IL outputted from the diode 42 and generates the DC output voltage Vout.

The reference voltage circuit 22 (voltage generation circuit) is a circuit which generates a reference voltage Vref1 which becomes the reference of the output voltage Vout and includes a diode 50, a capacitor 51, a Zener diode 52, and resistors 53 and 54.

The diode 50 and the capacitor 51 are rectifying and smoothing circuit which rectifies and smoothes the rectified voltage Vrec. Thus, a charge voltage Vc of the capacitor 51 is at a level lower than the peak level of the rectified voltage Vrec by a forward voltage of the diode 50. That is, supposing that the peak level (maximum level) of the rectified voltage Vrec is "Vpk" and the forward voltage of the diode 50 as "Vf1", the charge voltage Vc is as follows:

$$Vc=Vpk-Vf1 \quad (1)$$

The charge voltage Vc is applied to a cathode of the Zener diode 52, and an anode is grounded through the resistors 53 and 54. Thus, supposing that a Zener voltage of the Zener diode 52 is "Vz", the reference voltage Vref1 generated at the anode of the Zener diode 52 is as follows:

$$Vref1=Vc-Vz=Vpk-(Vf1+Vz) \quad (2)$$

The voltage "Vf1+Vz" is a predetermined value. Thus, the reference voltage Vref1 becomes a voltage at a level lower than the peak level Vpk only by a predetermined level.

The resistors 53 and 54 are voltage-dividing circuits (first voltage-dividing circuits) which divide the reference voltage Vref1, and supposing that a resistance value of the resistor 53 is "R1" and a resistance value of the resistor 54 is "R2", the divided voltage V1 is as follows:

$$V1=(R2/R1+R2) \times Vref1 \quad (3)$$

The resistors 30 and 31 are voltage-dividing circuits (second voltage-dividing circuits) which divide the output voltage Vout and supposing that a resistance value of the resistor 30 is "R3" and a resistance value of the resistor 54 is "R4", the divided voltage V2 is as follows:

$$V2=(R4/R3+R4) \times Vout \quad (4)$$

The resistance values R1 to R4 are determined so that the voltage-dividing ratio in the formula (3) "R2/R1+R2" becomes equal to the voltage-dividing ratio in the formula (4) "R4/R3+R4" in this embodiment.

The error amplifier 23 is a circuit which amplifies an error between the reference voltage Vref1 and the output voltage Vout on the basis of the voltages V1 and V2 and includes an operational amplifier 60, a resistor 61, and a capacitor 62. The error amplifier 23 and the resistors 30 and 31 correspond to an error voltage generation circuit.

The voltage V1 is applied to an inverting input terminal of the operational amplifier 60, and the voltage V2 is applied to a non-inverting input terminal. The resistor 61 and the capacitor 62 are connected between the inverting input terminal of the operational amplifier 60 and the output terminal. Thus, the error amplifier 23 integrates errors of the voltage V1 and the voltage V2. Then, the error amplifier 23 outputs an error voltage according to an error between the voltage V1 and the voltage V2 as the feedback voltage Vfb fed back to the control IC 24.

The resistors 32 and 33 are voltage-dividing circuits which divide the rectified voltage Vrec and generate a divided voltage Vd.

The resistor 34 (detection circuit) is a current detection resistor which detects the inductor current IL. The resistor 34 is provided between the emitter electrode of the transistor 41 and the full-wave rectification circuit 20 so that a collector current when the transistor 41 is ON or a current flowing through the diode 42, the load 15, the capacitor 43 and the like when the transistor 41 is OFF can be detected. Moreover, the inductor current IL includes a ripple component according to a switching frequency at which the transistor 41 is switched. Thus, the voltage Vr detected by the resistor 34 also includes the ripple component similar to that in the inductor current IL. Moreover, since the inductor current IL from the ground flows through the resistor 34 to the full-wave rectification circuit 20, the voltage Vr becomes a negative voltage.

The control IC 24 is a power factor correction control IC including terminals AC, FB, IS, and OUT and controls switching of the transistor 41 on the basis of the divided voltage Vd, the feedback voltage Vfb, and the voltage Vr. The divided voltage Vd, the feedback voltage Vfb, and the voltage Vr are applied to the terminals AC, FB, and IS, respectively.

Figure 2:
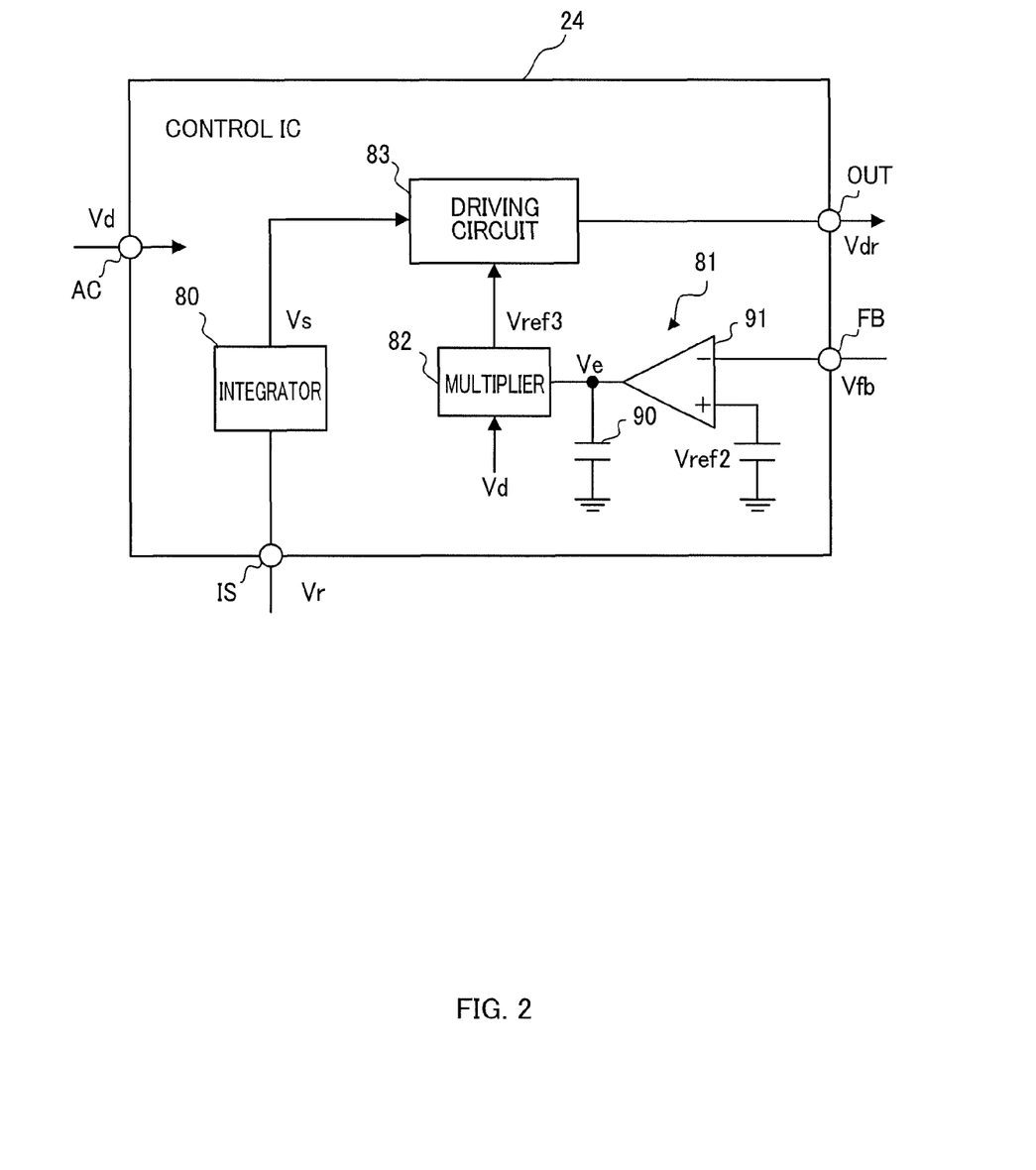
FIG. 2 is a diagram illustrating an example of a configuration of a control IC 24.

Here, an example of the configuration of the control IC 24 will be described by referring to FIG. 2.

The control IC 24 (switching control circuit) is a "multiplier type" PFC control IC and includes an integrator 80, an error amplifier 81, a multiplier 82, and a driving circuit 83. The integrator 80 outputs a voltage Vs indicating the inductor current IL from which the ripple component is removed (so-called an average current Iav of the inductor current IL) on the basis of the voltage Vr. Specifically, the integrator 80 integrates the voltage Vr so as to remove the ripple component contained in the voltage Vr and inverts and outputs the integrated result.

The error amplifier 81 is a circuit which generates a voltage Ve according to an error between the feedback voltage Vfb and a reference voltage Vref2 and includes a capacitor 90 and an operational amplifier 91. The operational amplifier 91 charges/discharges the capacitor 90 in accordance with an error between the feedback voltage Vfb applied to the terminal FB and the reference voltage Vref2. Thus, the voltage Ve according to the error between the feedback voltage Vfb and the reference voltage Vref2 is generated in the capacitor 90. The feedback voltage Vfb is applied to an inverting input terminal of the operational amplifier 91, while the reference voltage Vref2 is applied to a non-inverting input terminal. Thus, if the feedback voltage Vfb rises, the voltage Ve lowers, while if the feedback voltage Vfb lowers, the voltage Ve rises.

Figure 3:
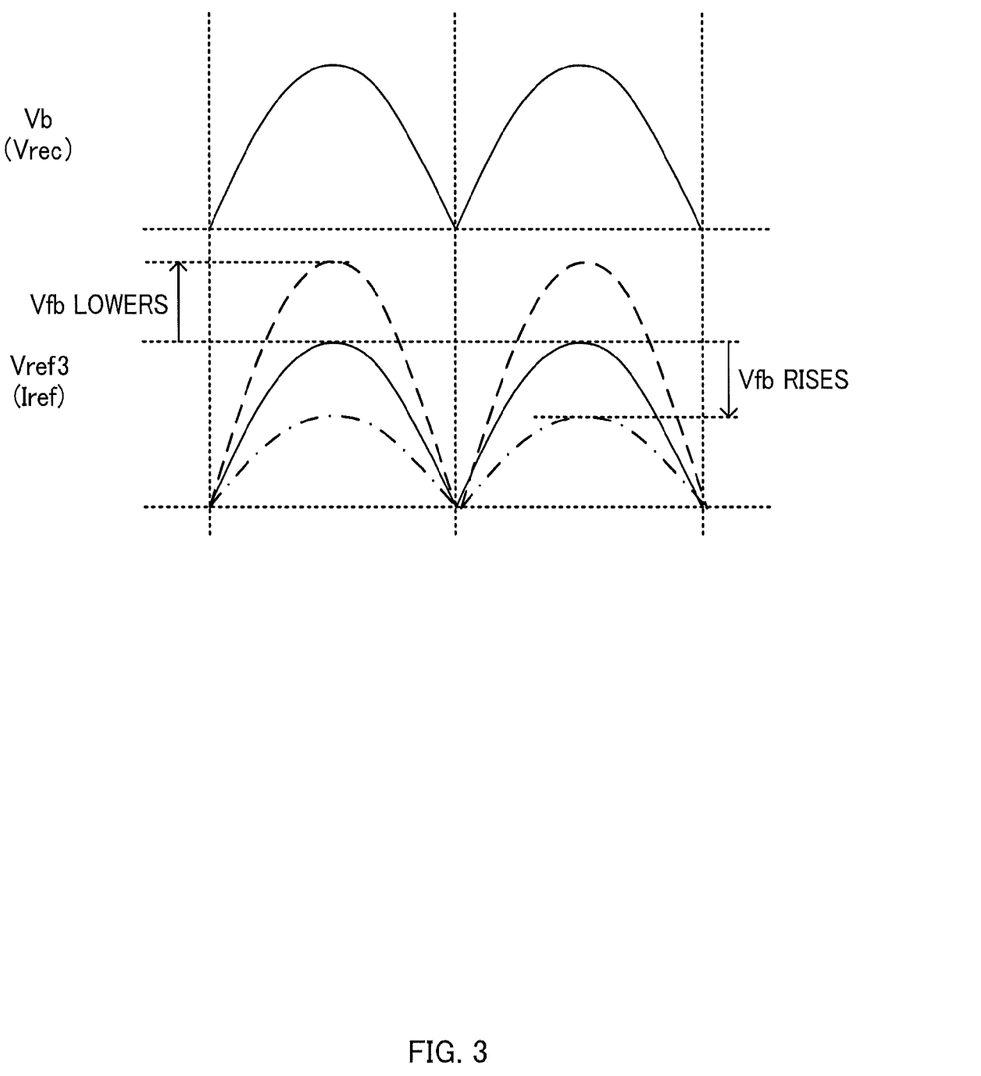
FIG. 3 is a diagram for explaining a waveform of a reference voltage Vref3 when a feedback voltage Vfb is changed.

The multiplier 82 generates a reference voltage Vref3 indicating a reference current Iref which becomes a reference of the average current Iav in the inductor current IL. Specifically, the multiplier 82 multiplies the divided voltage Vd changing similarly to the rectified voltage Vrec and the voltage Ve and outputs the multiplication result as the reference voltage Vref3. Thus, as illustrated in FIG. 3, for example, if the feedback voltage Vfb rises and the voltage Ve lowers, the reference voltage Vref3 lowers. On the other hand, if the feedback voltage Vfb lowers and the voltage Ve rises, the reference voltage Vref3 rises. Therefore, the reference current Iref which becomes the reference of the average current Iav in the inductor current IL decreases if the feedback Vfb rises and increases if the feedback voltage Vfb lowers.

The driving circuit 83 is a general circuit which generates a PWM (Pulse Width Modulation) modulated driving signal 83 and includes a triangular-wave oscillation circuit, a comparator and the like (not shown), for example. The driving circuit 83 performs switching of the transistor 41 if the voltage Vs is lower than the reference voltage Vref3, that is, if the average current Iav of the inductor current IL is smaller than the reference current Iref. On the other hand, if the voltage Vs is higher than the reference voltage Vref3, that is, if the average current Iav of the inductor current IL is larger than the reference current Iref, the driving circuit 83 stops switching of the transistor 41. The driving circuit 83 turns on/off the transistor 41 by outputting a driving signal Vdr through the terminal OUT.

In the power supply circuit 10 illustrated in FIG. 1, the inductor current IL increases each time the transistor 41 is turned on. Therefore, if the switching of the transistor 41 is performed when the voltage Vs is lower than the reference voltage Vref3, the inductor current IL increases and the voltage Vs rises. On the other hand, if the switching of the transistor 41 is stopped when the voltage Vs is higher than the reference voltage Vref3, the inductor current IL decreases and the voltage Vs lowers. Therefore, the switching of the transistor 41 is controlled in the power supply circuit 10 so that the voltage Vs matches the reference voltage Vref3. That is, the average current Iav of the inductor current IL is controlled so as to match the reference current Iref in the power supply circuit 10.

Moreover, in the power supply circuit 10, if the voltage V2 is higher than the voltage V1, the feedback voltage Vfb becomes high and thus, the reference current Iref decreases. As a result, the inductor current IL matching the reference current Iref also decreases, and the output voltage Vout and the voltage V2 lower. On the other hand, if the voltage V2 is lower than the voltage V1, contrary to the above-described operation when the voltage V2 is higher than the voltage V1, the output voltage Vout and the voltage V2 rise. Therefore, the voltage V2 matches the voltage V1 in the power supply circuit 10. In this embodiment, since the voltage-dividing ratio of the resistors 53 and 54 "R2/R1+R2" is equal to the voltage-dividing ratio of the resistors 30 and 31 "R4/R3+R4", the level of the output voltage Vout matches the level of the reference voltage Vref1 "Vpk−(Vf1+Vz)". As described above, the power supply circuit 10 generates a DC voltage lower than the peak level of the AC voltage Vac.

<<Example of Operation of Power Supply Circuit 10>>

Figure 4:
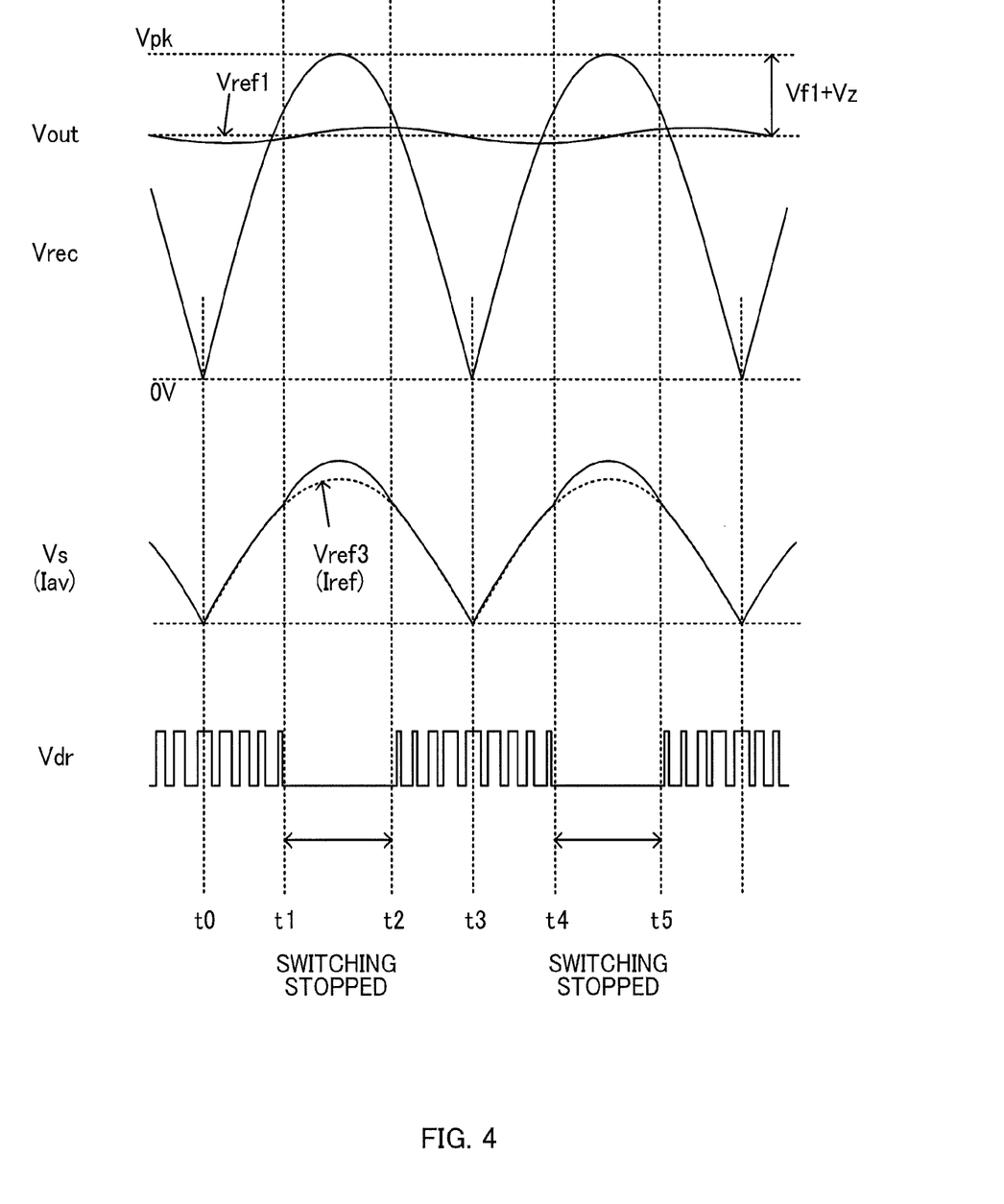
FIG. 4 is a diagram for explaining an operation of the power supply circuit 10.

Here, an example of the operation of the power supply circuit 10 when the output voltage Vout at the target level of "Vpk−(Vf1+Vz)" is generated will be described by referring to FIG. 4. The actual output voltage Vout slightly fluctuates around the target level "Vpk−(Vf1+Vz)". Moreover, it is supposed here that the target level "Vpk−(Vf1+Vz)" is determined so that if the rectified voltage Vrec applied to the inductor 40 gets close to the peak level "Vpk", the diode 42 is turned on. That is, in the power supply circuit 10, the Zener diode 52 at a large Zener voltage "Vz" (10 V, for example) is used so that the voltage "Vf1+Vz" becomes sufficiently larger than the forward voltage "Vf2" of the diode 42.

Moreover, in the power supply circuit 10, when the diode 42 is turned on, an inductance value of the inductor 40 and a capacitance value of the capacitor 43 are selected so that the average current Iav of the inductor current IL becomes larger than the reference current Iref while the target level output voltage Vout is generated.

First, if the rectified voltage Vrec rises from 0 V (zero volt) at time t0, the reference voltage Vref3 indicating the reference current Iref also rises. As a result, the voltage Vs indicating the average current Iay of the inductor current IL also rises similarly to the reference voltage Vref3. Then, from the time t0 to time t1, the switching of the transistor 41 is performed as appropriate so that the voltage Vs matches the reference voltage Vref3. As a result, the average current Iav of the inductor current IL matches the reference current Iref. FIG. 4 illustrates that the switching of the transistor 41 is performed all the time during the period from the time t0 to t1 for convenience, but actually, if the voltage Vs becomes higher than the reference voltage Vref3, the switching is stopped.

Subsequently, if the rectified voltage Vrec rises and the diode 42 is turned on at the time t1, the inductor current IL is fed back to the full-wave rectification circuit 20 via a path of the diode 42→the capacitor 43→the resistor 34, for example. Since the average current Iav of the inductor current IL when the diode 42 is turned on is larger than the reference current Iref, the switching of the transistor 41 is stopped. If the rectified voltage Vrec rises and satisfies a condition in the formula (5) below, for example, the diode 42 is turned on.

$$Vrec > Vout + Rdc \times IL + Vf2 \quad (5)$$

Here, "Rdc" is a resistance value of a so-called coil resistor of the inductor 40. Moreover, the switching of the transistor 41 is continuously forced to be stopped until the time t2 when the rectified voltage Vrec lowers and the diode 42 is turned off.

Then, if the rectified voltage Vrec lowers and the diode 42 is turned off at the time t2, the switching of the transistor 41 is performed as appropriate so that the voltage Vs matches the reference voltage Vref3, that is, the average current Iav of the inductor current IL matches the reference current Iref. Actually, even during the period from the time t2 to t3, if the voltage Vs becomes higher than the reference voltage Vref3, the switching is stopped. If the rectified voltage Vs lowers and satisfies a condition in the formula (6) below, for example, the diode 42 is turned off.

$$Vrec \leq Vout + Rdc \times IL + Vf2 - VL \quad (6)$$

Here, "VL" is an induced voltage induced by the inductor 40 by the peak current of the inductor current IL.

The operation of the power supply circuit 10 at the time t3 when the rectified voltage Vrec becomes 0 V and after is the same as the operation of the power supply circuit 10 from the time 0 to the time t3. Therefore, the switching of the transistor 41 is forcedly stopped in the vicinity of the peak level Vpk of the rectified voltage Vrec from time t4 to t5. As described above, the partial switching type PFC control can be executed.

<<Second embodiment (Power Supply Circuit 11)>>

Figure 5:
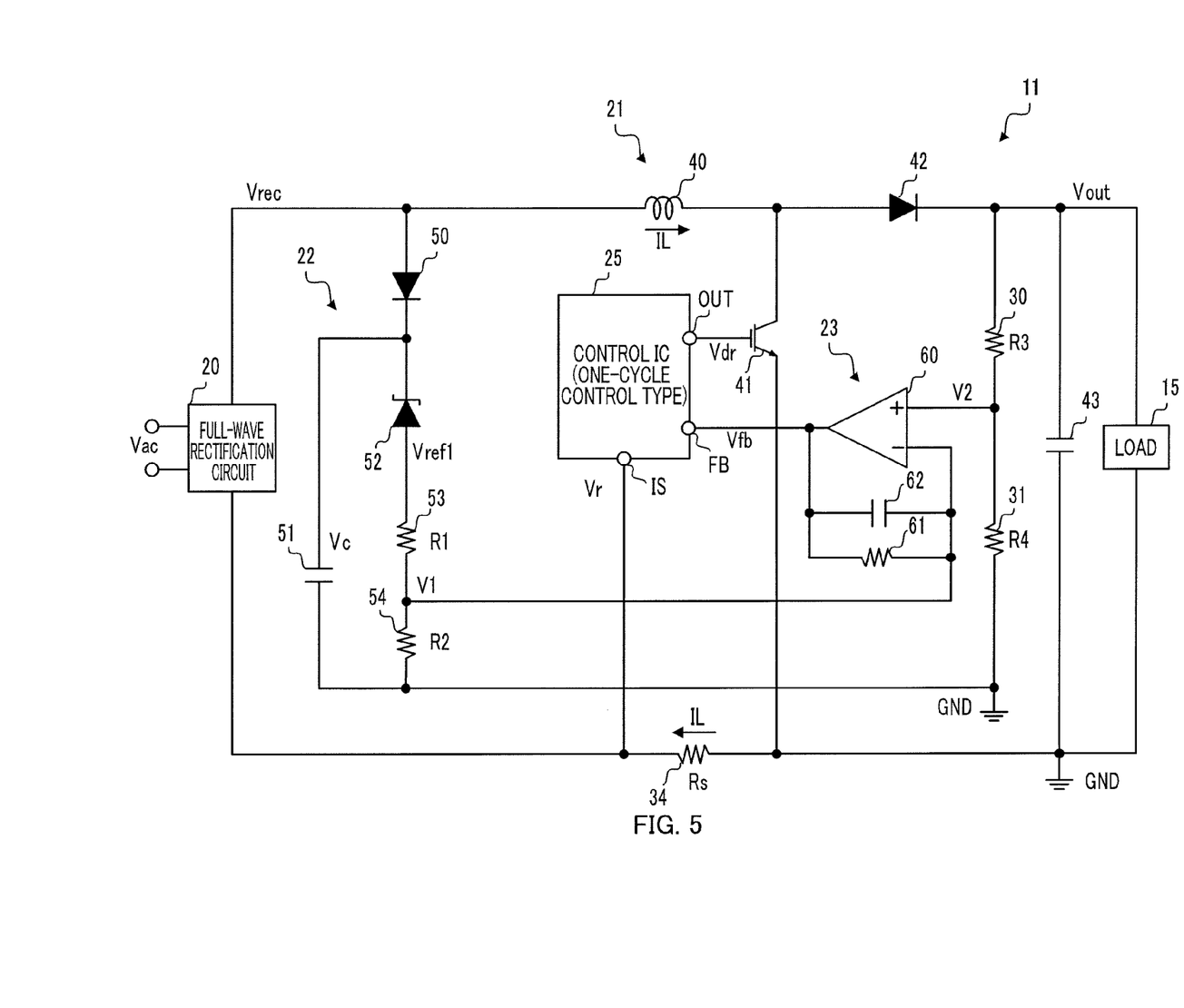
FIG. 5 is a diagram illustrating a configuration of a power supply circuit 11 which is a second embodiment of the present invention.

FIG. 5 is a diagram illustrating a configuration of a power supply circuit 11 which is a second embodiment of the present invention. The power supply circuit 11 is an AD-DC converter which generates the output voltage Vout (DC voltage) at a target level lower than the peak level of the AC voltage Vac from the AC voltage Vac similarly to the power supply circuit 10 and drives the load 15. The power supply circuit 11 includes the full-wave rectification circuit 20, the boost circuit 21, the reference voltage circuit 22, the error amplifier 23, a control IC 25, and the resistors 30 to 34. Since the configuration other than the control IC 25 is the same as the power supply circuit 10, detailed description will be omitted.

Figure 6:
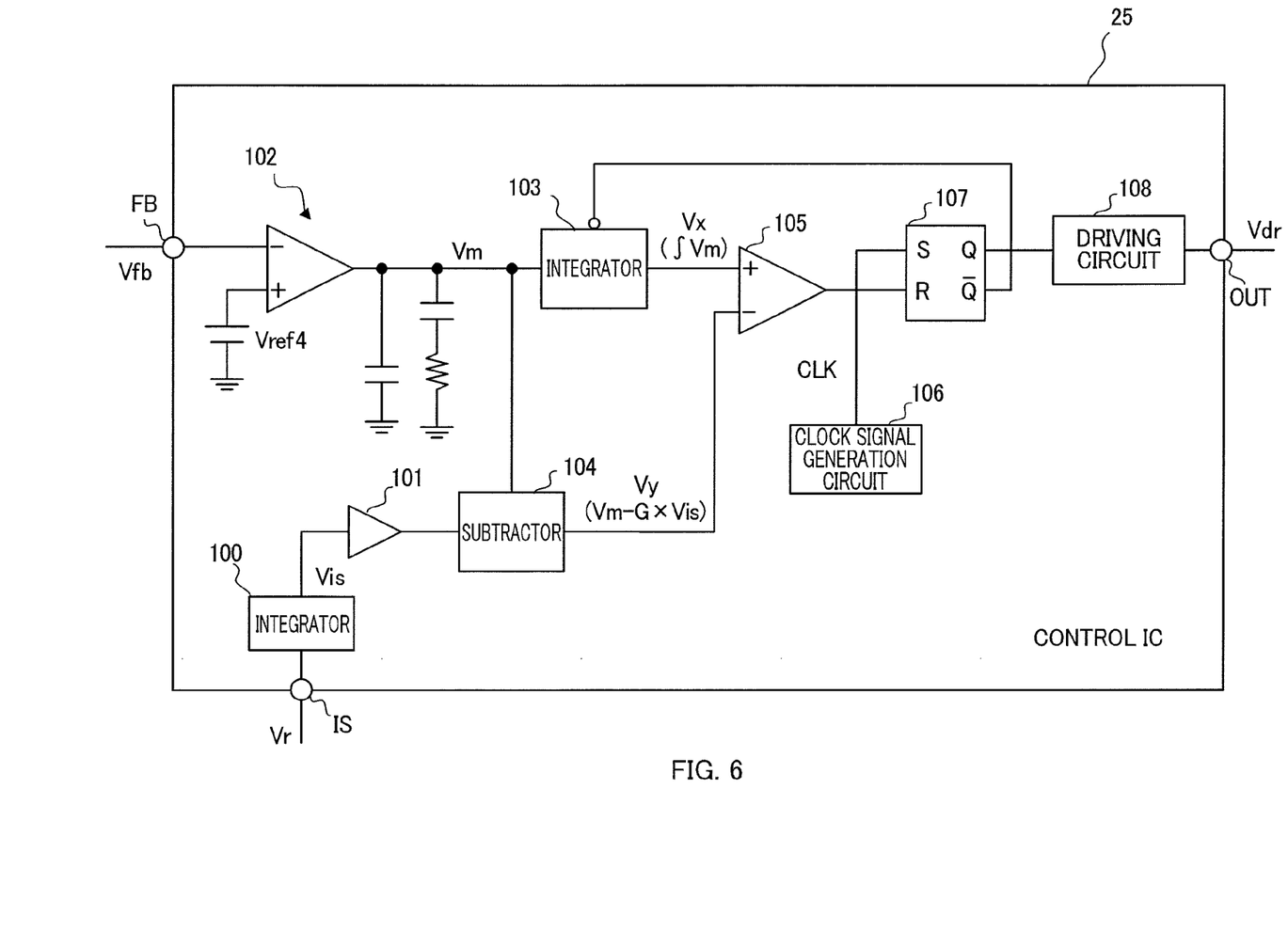
FIG. 6 is a diagram illustrating an example of a configuration of a control IC 25.

The control IC 25 (switching control circuit) is a "one-cycle control type" PFC control IC and includes integrators 100 and 103, an amplifier 101, an error amplifier 102, a subtractor 104, a comparator 105, a clock signal generation circuit 106, an RS flip-flop 107, and a driving circuit 108 as illustrated in FIG. 6.

The integrator 100 outputs a voltage Vis indicating the inductor current IL from which the ripple component is removed on the basis of the voltage Vr. Specifically, the integrator 100 integrates the voltage Vr in order to remove the ripple component included in the voltage Vr and inverts and outputs the integrated result.

The amplifier 101 amplifies the voltage Vis by a predetermined gain G. The error amplifier 102 generates a voltage Vm according to the error between the feedback voltage Vfb and a reference voltage Vref4.

The integrator 103 integrates the voltage Vm for each period of a clock signal CLK and generates a slope voltage (PWM ramp voltage) having inclination (Vm/Ts) obtained by dividing the voltage Vm by a period Ts of one period of the clock signal CLK. The slope voltage (PWM ramp voltage) outputted from the integrator 103 is referred to as a voltage Vx. Moreover, the integrator 103 is a reset integrator and resets the voltage Vx when a Q-bar output (inversion of a Q output) of the RS flip-flop 107 becomes an "L" level.

The subtractor 104 outputs a voltage Vy (=Vm−G×Vis) obtained by subtracting a voltage G×Vis outputted from the amplifier 101 from the voltage Vm.

The comparator 105 compares the voltages Vx and Vy and outputs an "H" level signal if the voltage Vx becomes higher than the voltage Vy. The clock signal generation circuit 106 generates the clock signal CLK having a predetermined period. Moreover, the RS flip-flop 107 is a flip-flop giving priority to reset.

The driving circuit 108 outputs the driving signal Vdr at the "H" level when the Q output of the RS flip-flop 107 becomes the "H" level and turns on the transistor 41.

==Waveform of the inductor current IL==

Figure 7:
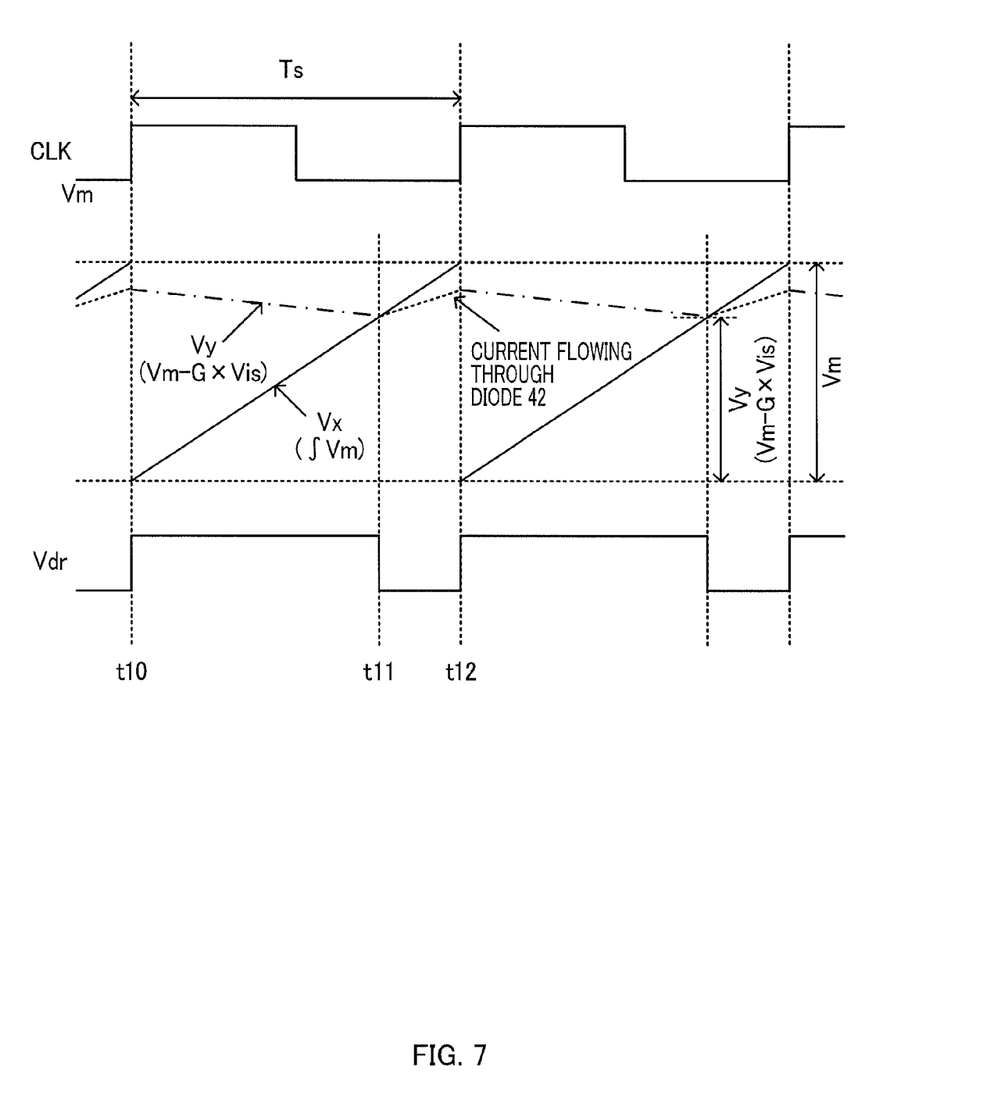
FIG. 7 is a diagram illustrating a major waveform of the control IC 25.

Here, the inductor current IL controlled by the "one-cycle control type" control IC 25 will be described by referring to FIG. 7. FIG. 7 is an example of a major waveform in each block of the control IC 25.

In the control IC 25, if the clock signal CLK becomes the "H" level at time t10, the voltage Vx is reset and rises with the above-described inclination (Vm/Ts). Moreover, if the clock signal CLK becomes the "H" level, the driving signal Vdr also becomes the "H" level, and the transistor 41 is turned on. If the transistor 41 is turned on, the inductor current IL and the voltage Vis increase, and the voltage Vy gradually lowers. Then, when the voltage Vx becomes higher than the voltage Vy at time t11, the driving signal Vdr becomes the "L" level, and the transistor 41 is turned off. During the period from the time t11 to time t12 when the transistor 41 is OFF, the inductor current IL flows via the diode 42.

In such a case, a duty ratio (on duty) Don with which the transistor 41 is turned on in the period Ts is as follows:

$$Don = Ton/Toff = (Vm - G \times Vis)/Vm \quad (7)$$

Ton is a period during which the transistor 41 is turned on, and Toff is a period during which the transistor 41 is turned off.

Moreover, the power supply circuit 11 operates as a boost converter including the boost circuit 21 and thus, the rectified voltage Vrec(t), the output voltage Vout(t), and Don(t) form the formula (8):

$$Vrec(t) = Vout(t) \times (1 - Don(t)) \quad (8)$$

In the formula (8), the Vrec(t), for example, indicates an instantaneous value of the rectified voltage Vrec. Therefore, the voltage Vm is as follows:

$$Vm = (Vout(t) \times G \times Vis)/Vrec(t) \quad (9)$$

Since the above-described voltage Vis, the inductor current IL(t), and the resistance value Rs of the resistor 34 form a relationship of Vis=Rs×IL(t), the following holds true:

$$IL(t) = (Vm/(Vout(t) \times G \times Rs)) \times Vrec(t) \quad (10)$$

Moreover, in the power supply circuit 11, the output voltage Vout(t) is controlled constant to be at a target level.

In the power supply circuit 11, a band of a current feedback loop is set sufficiently wider than a band of a voltage feedback loop. Therefore, during the period Ts when the inductor current IL is controlled, the voltage Vm can be considered to be constant. Moreover, since the gain "G" and the resistance value "Rs" are constant, "Vm/(Vout(t)×G×Rs" in the formula (10) becomes a constant.

Therefore, as illustrated in the formula (11), the waveform of the inductor current IL(t) has a shape similar to the rectified voltage Vrec(t).

$$IL(t) = K \times Vrec(t) \quad (11)$$

K (constant) is K=Vm/(Vout(t)×G×Rs).

As described above, the "one-cycle control type" control IC 25 controls switching of the transistor 41 so that the inductor current IL becomes "K×Vrec(t)". Therefore, "K×Vrec(t)" on the right side of the formula (11) becomes the "reference current" which becomes a reference of the inductor current IL(t). Thus, if the inductor current IL exceeds the reference current "K×Vrec(t)", the transistor 41 is turned off.

<<Example of Operation of Power Supply Circuit 11>>

Figure 8:
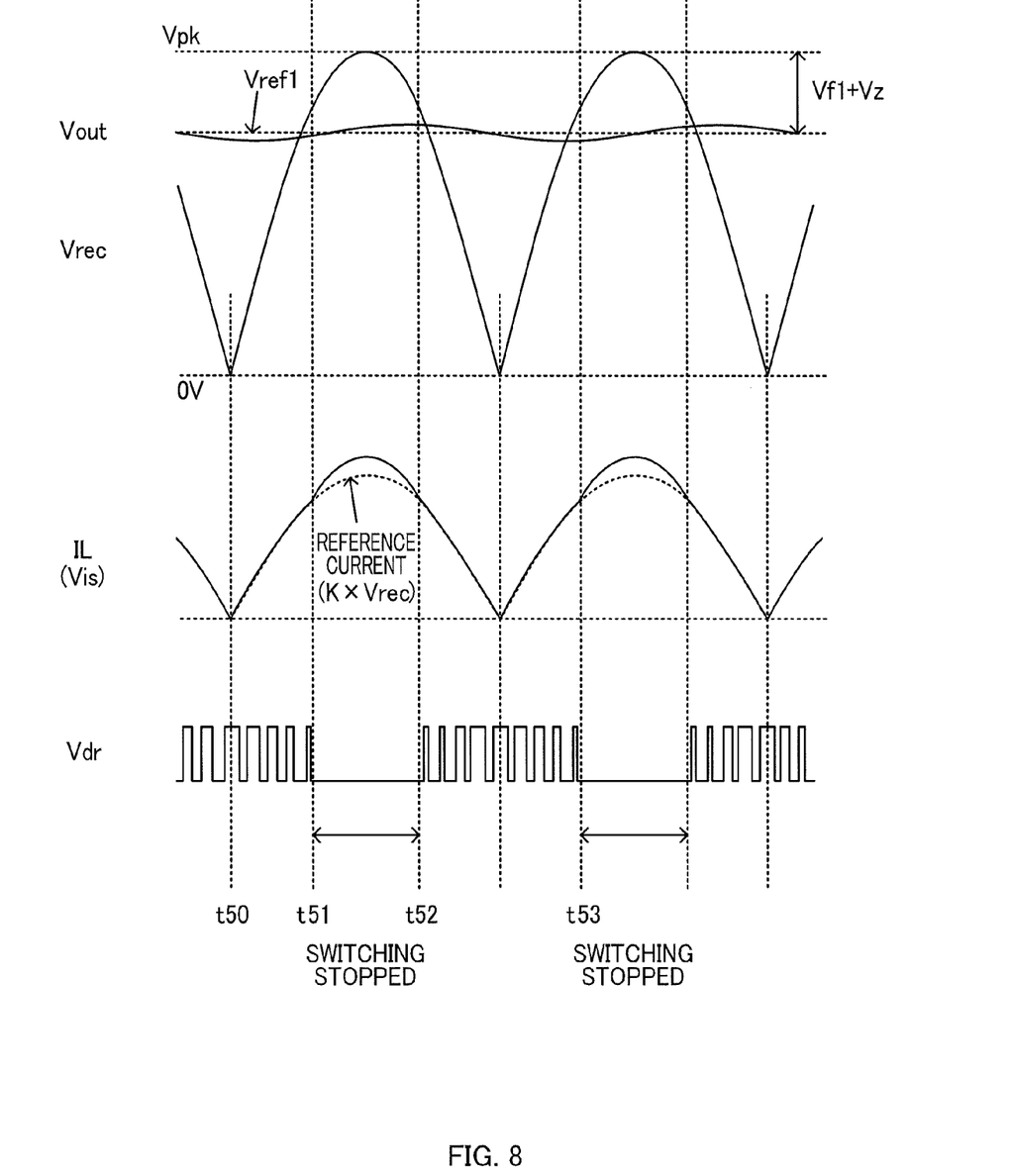
FIG. 8 is a diagram for explaining an operation of the power supply circuit 11.

An example of an operation of the power supply circuit 11 in which the output voltage Vout at the target level "Vpk −(Vf1+Vz)" is generated will be described by referring to FIG. 8. Various conditions when the power supply circuit 11 is operated are the same as the various conditions when the above-described power-supply circuit 10 is operated.

Moreover, in the power supply circuit 11, when the diode 42 is turned on, the inductance value of the inductor 40 and the capacity value of the capacitor 43, for example, are selected so that the inductor current IL becomes larger than the reference current ("K×Vrec(t)") while the output voltage Vout at the target level is generated.

From time t50 to t51, the switching of the transistor 41 is performed so that the inductor current IL becomes the reference current "K×Vrec". Then, when the diode 42 is turned on at the time t51, the inductor current IL becomes larger than the reference current ("K×Vrec(t)") when the output voltage Vout at the target level is generated, and thus, the switching of the transistor 41 is stopped. While the diode 42 is ON, the inductor current IL flows through the diode 42. Then, as the rectified voltage Vrec lowers, the inductor current IL flowing through the diode 42 decreases, and when the current becomes smaller than the reference current ("K×Vrec(t)") at time t52, the switching of the transistor 41 is resumed. Therefore, from the time t52 to time t53 when the diode 42 is turned on again, the switching of the transistor 41 is performed so that the inductor current IL becomes the reference current "K×Vrec". As described above, the power supply circuit 11 can execute the partial switching type PFC control.

The power supply circuits 10 and 11 of this embodiment have been described. The power supply circuits 10 and 11 do not have to use a microcomputer, a zero-cross detection circuit or the like, for example, when the partial switching type PFC control is executed. Thus, the power supply circuits 10 and 11 can improve the power factor with an inexpensive configuration. Moreover, though the power supply circuits 10 and 11 use the boost circuit 21, the level of the output voltage Vout is lower than the peak level Vpk. Thus, during the period, when the diode 42 is turned on based on the rectified voltage Vrec, the partial switching is executed.

For example, if the target level output voltage Vout, which is lower than the peak level of the AC voltage Vac, is to be generated, it is not necessarily required to use the reference voltage circuit 22 and the error amplifier 23 in the power supply circuits 10 and 11. Specifically, the target level output voltage Vout lower than the peak level of the AC voltage Vac can be generated by applying the voltage V2 as the feedback voltage to the terminal FB and by adjusting the voltage-dividing ratio "R4/R3+R4". However, in such a case, if the amplitude of the AC voltage Vac is fluctuated, for example, the period during which the switching of the transistor 41 is forcedly stopped (period fo partial switching) is changed. Accordingly, the period when the switching is stopped becomes longer, the power factor is deteriorated, and the harmonic current standard cannot be met in some cases. In the power supply circuits 10 and 11, since a difference between the peak level of the AC voltage Vac and the target level is predetermined, the period of partial switching can be kept constant even if the amplitude of the AC voltage Vac is fluctuated.

Moreover, the reference voltage Vref1 is generated by using the Zener diode 52. Thus, the power supply circuit 10 can be realized by a configuration more inexpensive than the case in which the reference voltage Vref1 is generated by using a regulator circuit or the like, for example. However, if the reference voltage Vref1 is to be set with high accuracy, the reference voltage Vref1 can be generated by using a regulator circuit such as a shunt regulator and the like.

Moreover, in the power supply circuit 10, the output voltage Vout can be made a desired level by adjusting the voltage-dividing ratio "R2/R1+R2" or the voltage-dividing ratio "R4/R3+R4".

Moreover, in the power supply circuit 10, the resistor 34 is used when the inductor current IL is detected. Thus, the inductor current IL can be detected with a configuration simpler than the case in which a detection circuit or the like which detects the inductor current IL on the basis of the voltages on both-end of the inductor 40, for example, is used.

As described above, in this embodiment, a control circuit which holds the difference between the peak value of the rectified voltage obtained by rectifying the AC voltage and the output voltage constant is used instead of the control method of keeping the output voltage constant in order to execute partial switching.

For example, the control IC 24 stops the switching of the transistor 41 if the average current Iav of the inductor current IL becomes larger than the reference current Iref, but this is not limiting. For example, the control IC 24 may stop the switching of the transistor 41 if the peak current of the inductor current IL becomes larger than the reference current Iref.

Moreover, whatever type of the PFC control IC the control IC 24 and 25 may be, the similar effect to this embodiment can be obtained if the control IC 24 stops the switching of the transistor 41 when the inductor current IL becomes larger than the reference current Iref and the switching of the transistor 41 is performed when the inductor current IL becomes smaller than the reference current Iref.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A power supply circuit configured to generate a DC voltage at a target level from an AC voltage, comprising:
    a rectification circuit configured to output a rectified voltage obtained by rectifying the AC voltage;
    an inductor configured to be applied with the rectified voltage;
    a transistor connected in series with the inductor, the transistor configured to increase an inductor current flowing through the inductor when turned on;
    a diode connected in series with the inductor, the diode configured to output the inductor current when the transistor is turned off;
    a capacitor configured to be charged with a current from the diode and generate the DC voltage;
    a detection circuit configured to detect the inductor current; and
    a switching control circuit configured to
        be inputted with the detected inductor current and a feedback voltage, the feedback voltage changed according to the DC voltage,
        perform switching of the transistor so that a level of the DC voltage is equal to the target level and the inductor current is equal to a reference current, when the detected inductor current is smaller than the reference current changed according to the feedback voltage, and
        stop switching of the transistor when the detected inductor current is larger than the reference current,
    the target level corresponding to a level at which the diode is turned on when the rectified voltage rises,
    when the rectified voltage rises and the diode is turned on, the inductor and the capacitor respectively having an inductance value and a capacitance value for allowing the inductor current larger than the reference current to flow, the reference current corresponding to a current when the level of the DC voltage is equal to the target level.

2. The power supply circuit according to claim 1, further comprising:
    a voltage generation circuit configured to generate a reference voltage at the target level lower than a maximum level of the rectified voltage by a predetermined level based on the rectified voltage; and
    an error voltage generation circuit configured to output an error voltage, as the feedback voltage, to the switching control circuit, the error voltage changed according to an error between the reference voltage and the DC voltage.

3. The power supply circuit according to claim 2, wherein the voltage generation circuit includes:
    a rectifying and smoothing circuit configured to rectify and thereafter smooth the rectified voltage so that the rectified voltage at a largest level is generated; and
    a Zener diode configured to generate the reference voltage based on the voltage smoothed by the rectifying and smoothing circuit.

4. The power supply circuit according to claim 3, wherein the error voltage generation circuit includes:
    a first voltage-dividing circuit configured to divide the reference voltage;
    a second voltage-dividing circuit configured to divide the DC voltage with the same voltage-dividing ratio as that of the first voltage-dividing circuit; and
    an error amplifier circuit configured to amplify an error between the voltage obtained by dividing the reference voltage in the first voltage-dividing circuit and the voltage obtained by dividing the DC voltage in the second voltage-dividing circuit and output the error voltage.

5. The power supply circuit according to claim 4, wherein:
    the detection circuit includes a resistor configured to detect, as the inductor current, a current flowing from the transistor and the capacitor to the rectification circuit.

6. A switching control circuit for a power supply circuit configured to generate a DC voltage at a target level from an AC voltage, comprising:
    a first error amplifier configured to output a feedback voltage by comparing a divided voltage representative of the DC voltage to a first reference voltage; and
    a power factor control circuit having a first input for receiving a detected current signal, a second input for receiving the feedback voltage, and an output for providing a drive voltage to control switching of a transistor, for providing the drive voltage based on an error voltage, formed by comparing the feedback voltage to a second reference voltage, and an average of the detected current signal formed by integrating the detected current signal, wherein the power factor control circuit further has:
        a second error amplifier for generating the error voltage according to an error between the feedback voltage and the second reference voltage;
        a multiplier for generating a third reference voltage by multiplying the error voltage and a rectified AC voltage;

an integrator for receiving the detected current signal and providing a voltage corresponding to the average of the detected current signal; and a driving circuit for providing a pulse width modulated drive voltage when the third reference voltage is greater than the voltage corresponding to the average of the detected current signal, and stopping providing the pulse width modulated drive voltage when the voltage corresponding to the average of the detected current signal is greater than the third reference voltage.

7. The switching control circuit of claim 6, wherein the first error amplifier comprises:

an operational amplifier having a non-inverting input for receiving the divided voltage, an inverting input for receiving the first reference voltage, and an output for providing the feedback voltage;

a resistor having a first terminal coupled to the inverting input of the operational amplifier, and a second terminal coupled to the output of the operational amplifier; and a capacitor having a first terminal coupled to the inverting input of the operational amplifier, and a second terminal coupled to the output of the operational amplifier.

8. The switching control circuit of claim 6, wherein:

the transistor having a first current electrode adapted to be coupled to a second terminal of an inductor, a control electrode for receiving the drive voltage, and a second current electrode adapted to be coupled to a reference voltage terminal.

9. The switching control circuit of claim 6, wherein:

the transistor is an insulated gate bipolar transistor.

10. The switching control circuit of claim 6, wherein the second error amplifier, the multiplier, the integrator, and the driving circuit are combined on a single integrated circuit.

11. The switching control circuit of claim 10, wherein the first error amplifier is external to the single integrated circuit.

12. The switching control circuit of claim 6, wherein the power factor control circuit comprises:

a second error amplifier for generating the error voltage according to an error between the feedback voltage and the second reference voltage;

a first integrator for receiving the detected current signal and providing the average of the detected current signal;

a subtractor for subtracting a signal proportional to the average of the detected current signal from the error voltage to provide a difference voltage;

a second integrator for receiving the error voltage and providing an average of the error voltage; and a pulse width modulation circuit for providing the drive voltage having a duty cycle during a period of a clock signal corresponding to a time when the average of the error voltage is less than the difference voltage.

13. The switching control circuit of claim 12, wherein the second error amplifier, the first integrator, the subtractor, the second integrator, and the pulse width modulation circuit are combined on a single integrated circuit.

14. The switching control circuit of claim 13, wherein the first error amplifier is external to the single integrated circuit.

15. A method for a power supply circuit configured to generate a DC voltage at a target level from an AC voltage, comprising:

generating a feedback voltage by comparing a divided voltage representative of the DC voltage to a first reference voltage;

generating an error voltage according to an error between the feedback voltage and a second reference voltage;

receiving a detected current signal;

integrating the detected current signal to provide an average of the detected current signal; and providing a drive voltage to control switching of a transistor based on the error voltage and the average of the detected current signal by:

generating a third reference voltage by multiplying the error voltage and a rectified AC voltage;

providing a pulse width modulated drive voltage when the third reference voltage is greater than the voltage corresponding to the average of the detected current signal; and stopping providing the pulse width modulated drive voltage when the voltage corresponding to the average of the detected current signal is greater than the third reference voltage.

16. The method of claim 15, wherein the generating the feedback voltage comprises:

integrating a difference between the divided voltage representative of the DC voltage and the first reference voltage.

17. The method of claim 16, wherein the integrating comprises:

integrating the difference between a second voltage, equal to a fraction of the DC voltage, and a first voltage, equal to the fraction of a target voltage.

18. The method of claim 15, wherein the providing comprises:

integrating the detected current signal to provide the average of the detected current signal;

subtracting a signal proportional to the average of the detected current signal from the error voltage to provide a difference voltage;

integrating the error voltage to provide an average of the error voltage; and providing the drive voltage having a duty cycle during a period of a clock signal corresponding to a time when the average of the error voltage is less than the difference voltage.

* * * * *